United States Patent [19]
Dannawi et al.

[11] Patent Number: 5,660,116
[45] Date of Patent: Aug. 26, 1997

[54] IMPACT-ABSORBER DEVICES, IMPACT-ABSORPTION METHOD, AND FRAMEWORK AND VEHICLE INCLUDING SUCH IMPACT-ABORBER DEVICES

[75] Inventors: Marwan Dannawi, Nantes Cedex; Jean-Pierre Barjolle, La Rochelle; Sylvie Jeunehomm, Salles sur Mer, all of France

[73] Assignee: GEC Alsthom Transport SA, Paris, France

[21] Appl. No.: 647,051

[22] Filed: May 9, 1996

Related U.S. Application Data

[62] Division of Ser. No. 233,465, Apr. 26, 1994, Pat. No. 5,579,699.

[30] Foreign Application Priority Data

Nov. 25, 1993 [FR] France .................................. 93 14096

[51] Int. Cl.$^6$ .................................................. B61D 17/00
[52] U.S. Cl. .................. 105/392.5; 105/5; 105/396; 105/413; 105/416; 105/418; 188/377; 296/189
[58] Field of Search ..................... 105/5, 6, 392.5, 105/396, 397, 399, 404, 407, 413, 414, 416, 418; 213/1 A, 9, 220; 188/377; 293/133; 296/189, 203, 204, 205

[56] References Cited

U.S. PATENT DOCUMENTS

| | | | |
|---|---|---|---|
| 574,257 | 12/1896 | McKeen et al. | 213/9 |
| 594,891 | 12/1897 | McKeen | 213/9 |
| 601,900 | 4/1898 | McKeen | 213/9 |
| 1,989,834 | 2/1935 | Watson | 105/416 |
| 2,620,751 | 12/1952 | Watter | 105/416 |
| 2,776,695 | 1/1957 | Wells | 213/1 A |
| 3,237,574 | 3/1966 | Smith et al. | 213/223 |
| 3,294,465 | 12/1966 | Borger | 105/5 |
| 3,339,501 | 9/1967 | Gutridge | 105/420 |
| 3,831,997 | 8/1974 | Myers | 188/377 |
| 3,848,886 | 11/1974 | Feustel et al. | 296/189 X |
| 3,915,486 | 10/1975 | Maeda et al. | 293/133 |
| 4,029,350 | 6/1977 | Goupy et al. | 188/377 |
| 4,466,356 | 8/1984 | Messersmith et al. | 105/5 |

FOREIGN PATENT DOCUMENTS 635630  9/1936  Germany .................... 213/220

*Primary Examiner*—S. Joseph Morano
*Attorney, Agent, or Firm*—Sughrue, Mion, Zinn, Macpeak & Seas

[57] ABSTRACT

The invention concerns impact-absorber devices, an impact-absorption method, and a framework and a vehicle including such impact-absorber devices. According to the invention, the impact-absorber device comprises at least one longitudinal member absorbing by deformation the energy generated by an impact in a given direction, which member is made from thin plate, having a generally triangular cross-section in a plane perpendicular to the direction of impact. Applications to rail vehicles, for example.

9 Claims, 20 Drawing Sheets

FIG. 3
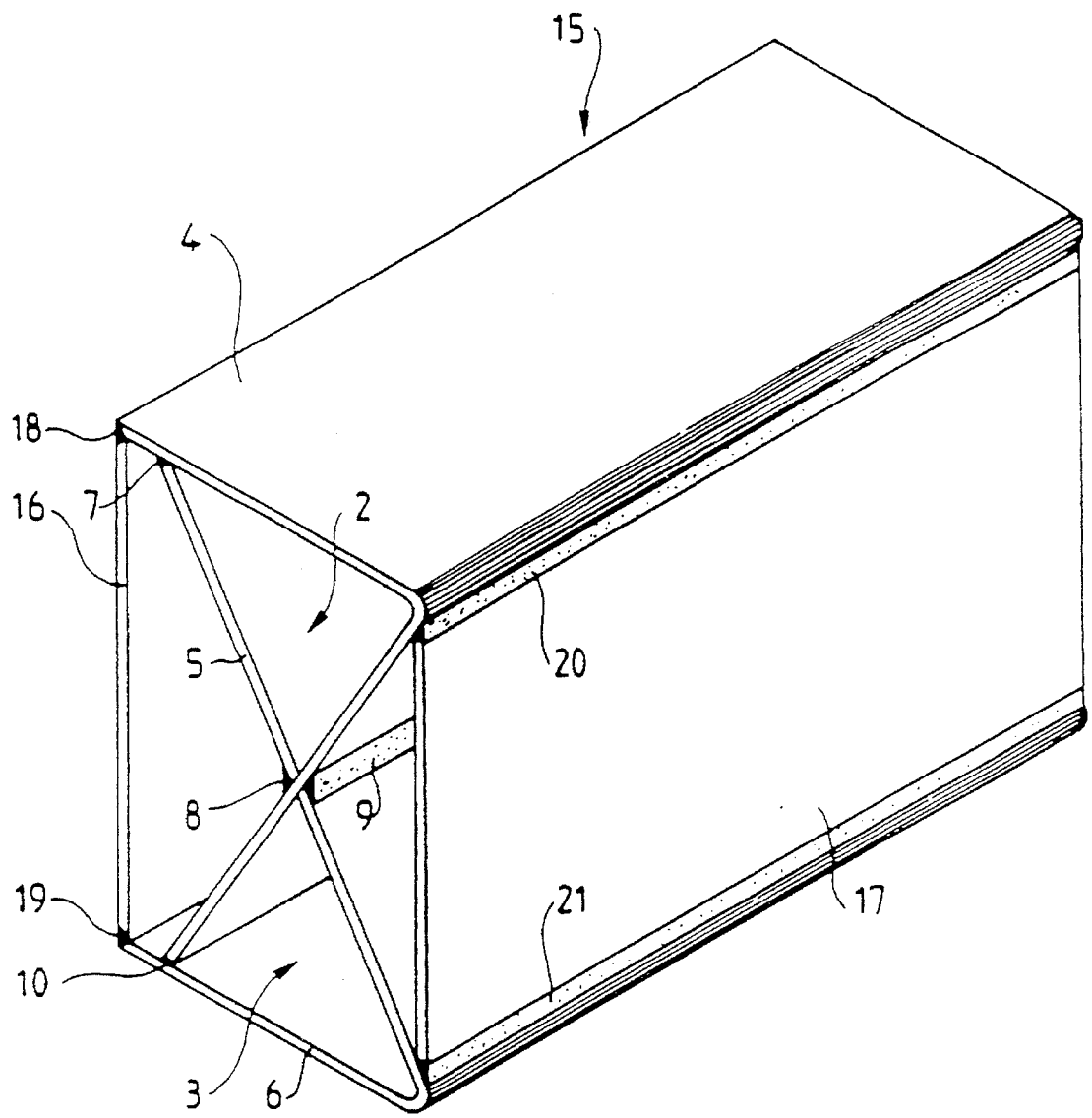
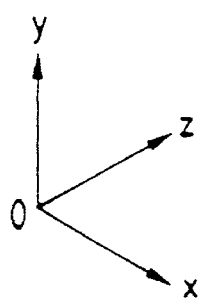

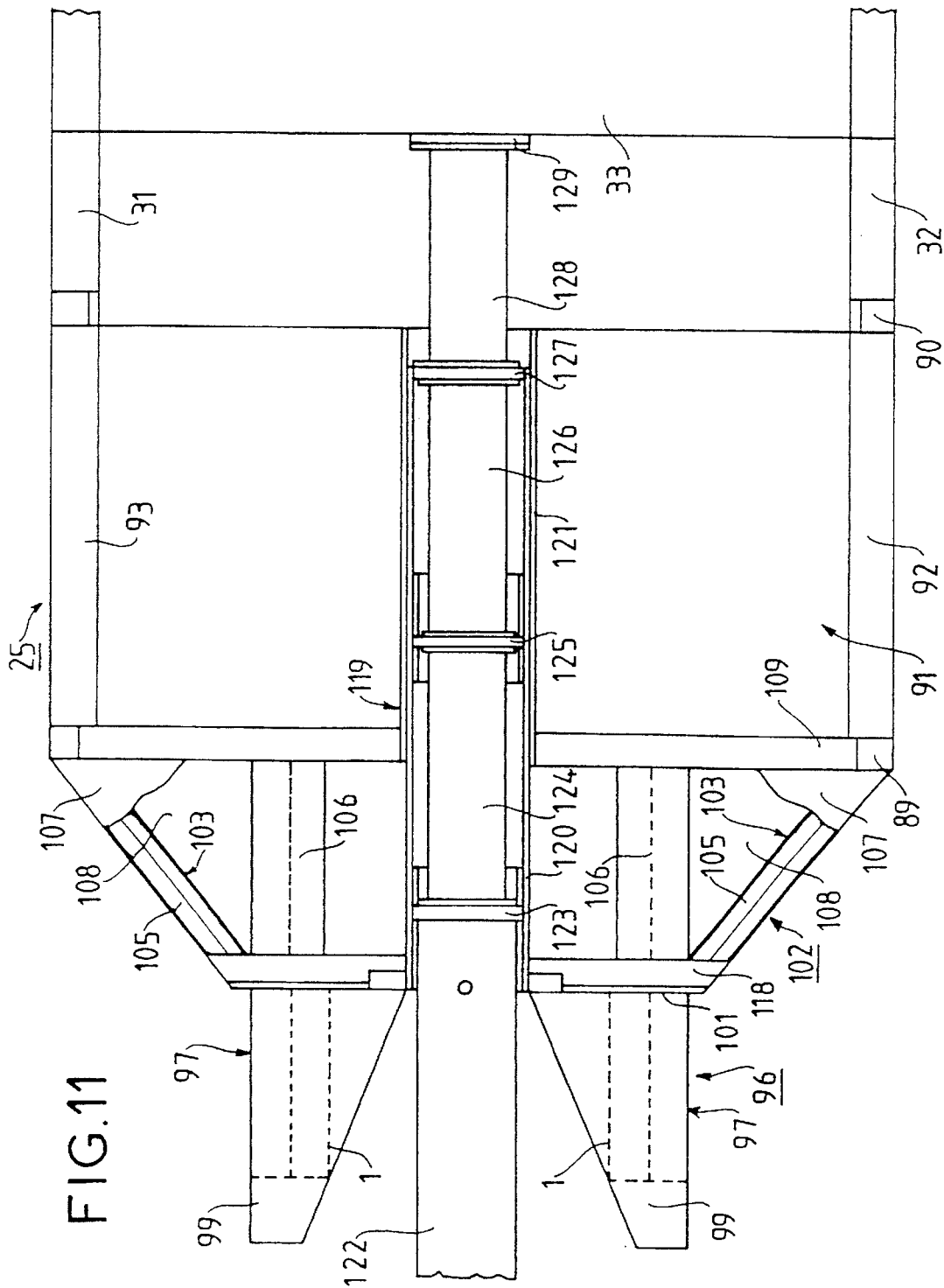

5,660,116

IMPACT-ABSORBER DEVICES, IMPACT-ABSORPTION METHOD, AND FRAMEWORK AND VEHICLE INCLUDING SUCH IMPACT-ABORBER DEVICES

This is a divisional of application Ser. No. 08/233,465 filed Apr. 26, 1994, now U.S. Pat. No. 5,579,699.

The invention concerns impact-absorber devices, an impact-absorption method, and a framework and a vehicle including such impact-absorber devices. The instant application contains subject matter related to that of copending application Ser. No. 08/227,010, now U.S. Pat. No. 5,462,144, which was filed on Apr. 13, 1994, and is assigned to the same assignee.

BACKGROUND OF THE INVENTION

Some prior art impact-absorber devices are in the form of reversible deformation systems based on dissipation of energy by dry or viscous friction. In rail transport applications they are incorporated in the buffers and in the bodies of automatic couplings. These systems have the, drawback of a low unit energy absorption capability, around 50 kJ per unit.

Another impact-absorber device is the shield disposed on the motive power unit of a train, especially high-speed trains. The shield has a honeycomb or tube construction deforming in compression. It is a large member attached to the train and has the drawback that it does not contribute to the transmission of longitudinal forces in the chassis. Also, it protects only the driver.

The safety of train passengers in the event of a collision is currently a matter of great concern. Increasing train speeds increase the danger in the event of an accident. A recent spate of accidents has shown that improvements in signalling have not eliminated all risks of collision.

An impact-absorber device that is more effective than current devices is therefore required. This device must, on impact, bring about lengthwise collapse of the axis of the motive power unit to prevent the latter from skewing on the track. It must also be light enough to satisfy train axle load limits. It must also be compact in size, since space saving is most important in the motive power units and in the passenger cars.

OBJECTS AND SUMMARY OF THE INVENTION

The present invention mitigates the drawbacks of the prior art and meets the stated requirements in terms of effectiveness, weight and overall size. It finds a particularly beneficial application in rail transport where the amount of energy to be absorbed on impact can be considerable. It can nevertheless be used in other fields to absorb impact between a moving vehicle and an obstacle or between two moving vehicles (cars, lifts, etc).

The effectiveness of the proposed device resides in the specific shape of its section transverse to the direction of impact.

The invention consists in an impact-absorber device comprising at least one longitudinal member absorbing by deformation the energy generated by an impact in a given direction wherein said member is made from thin plate, having a generally triangular cross-section in a plane perpendicular to the direction of impact.

Said member can have two parallel opposite sides and two sides forming with one of the parallel sides a longitudinal member having a generally triangular transverse cross-section.

The invention also consists in a framework including at least one impact-absorber device disposed between non-deformable parts of the framework.

The invention further consists in a vehicle including a framework according to the invention.

The invention further consists in an impact-absorption method wherein, in the event of a frontal impact, the passenger and driver areas of the vehicle do not undergo any plastic deformation before all possible energy has been absorbed by the impact-absorber devices.

BRIEF DESCRIPTION OF THE DRAWINGS

Other objects, features and advantages of the invention emerge from the description of the impact-absorber device and impact-absorption method of the invention given with reference to the accompanying drawings, in which:

FIG. 3 shows a further embodiment of the impact-absorber device of the invention, FIG. 11 shows the rail vehicle body framework from FIG. 8 in cross-section, FIGS. 12a through 12d and 13a and 13b respectively show various stages in the collapse of the third and fourth impact-absorber devices, FIGS. 14a and 14b through 17a and 17b show four stages in the deformation of the framework of the rail vehicle body incorporating the impact-absorber devices of the invention.

MORE DETAILED DESCRIPTION

Figure 1:
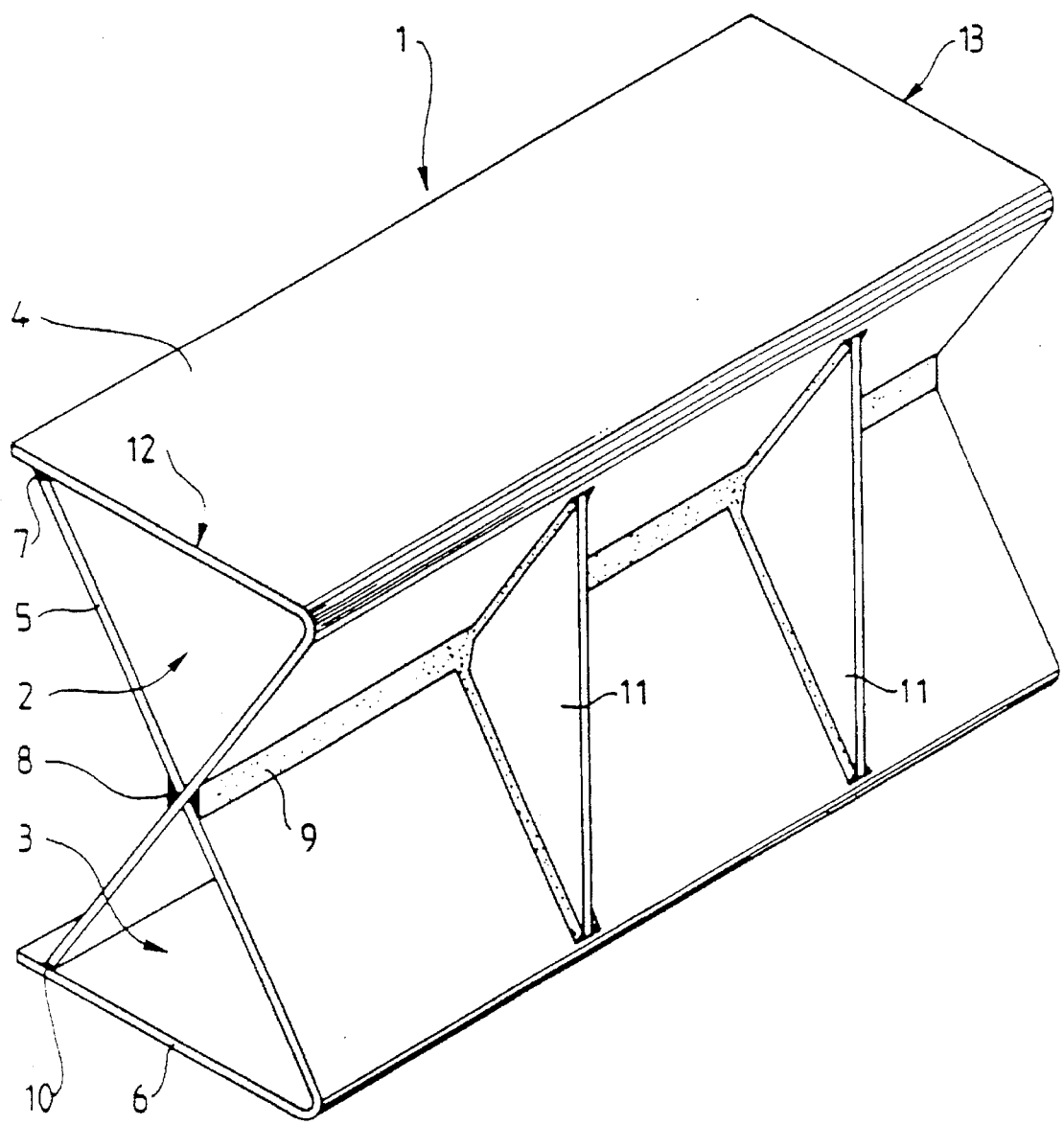
FIG. 1 shows an impact-absorber device of the invention constituted by a single longitudinal member.

The impact-absorber device shown in FIG. 1 comprises a single longitudinal member 1 aligned with the impact direction Oz. The cross-section of this member in the xOy plane perpendicular to the impact direction and it is in the shape of two triangles 2 and 3 having a common vertex. The sides of the triangles 2 and 3 are the metal walls of the member 1. The sides of the triangles can be straight or slightly curved. The vertices of the triangles can optionally be rounded, as shown in the figure.

The member 1 is made from thin plate. In the case of FIG. 1 it is constructed from three plates 4, 5 and 6 welded together by weld beads 7, 8, 9 and 10. The plates 4 and 6 are bent to form two corners of the triangles 2 and 3.

The material from which the thin plates is made depends on the amount of energy that the device is intended to absorb. Steel allows a large amount of energy to be absorbed.

The member 1 is made from thin plate so that in the event of an impact of sufficient energy it collapses concertina fashion in the direction of impact. Impact tests have shown that this structure behaves in a doubly advantageous manner. Firstly, it can collapse by about 70% of its original length, which is exceptional. Secondly, it collapses without any generalized buckling of the member, which collapses without any change in its direction.

The thickness of the thin plate depends on the outside dimensions of the member. The member must be able to collapse concertina fashion on impact due to localized buckling of the thin plates. Calculation and experiments can optimize the thickness as a function of the outside dimensions of the member for a given amount of energy to be absorbed.

For reasons of symmetry the best results are obtained for a cross-section of the member including two identical triangles facing in opposite directions. In other words, the cross-section is X-shaped, with two opposite sides closed.

In use, or for the purposes of an impact test, the ends 12 and 13 are welded to respective brackets, the member having to absorb the energy associated with an impact by virtue of its deformation. The member collapses concertina fashion substantially within its original outline.

Localized strengthening members 11 can be provided between the two triangles 2 and 3 in planes perpendicular to the impact direction. They are advantageously attached by welding and improve the torsional stability of the member 1.

Figure 2:
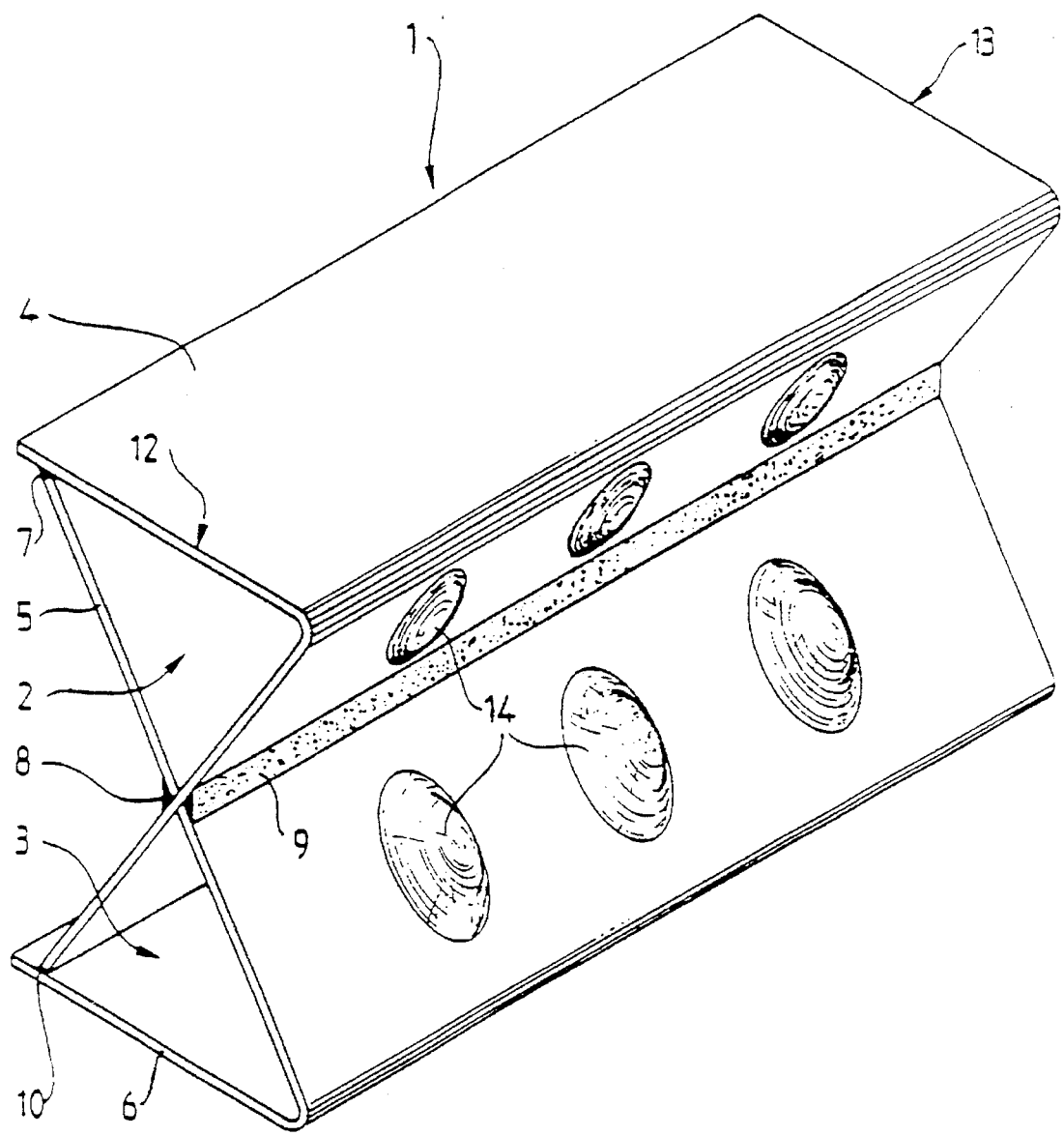
FIG. 2 shows a different embodiment of the impact-absorber device of the invention.

In the embodiment shown in FIG. 2 the plates 4, 5 and 6 are stamped in localized areas like the areas 14. The shape and location of the stamped areas can be determined by calculation and experiment.

The device 15 shown in FIG. 3 can absorb impacts of greater energy than the device described above. The basic structure is the same as that of FIG. 1 and the same component parts are identified by the same reference numbers. The corners between the triangles 2 and 3 are now closed by thin plates 16 and 17 welded by respective weld beads 18, 19 and 20, 21 to the remainder of the member.

If collapse along the Oz axis occurs as previously described the plates 16 and 17 become corrugated, the outline of the member remaining approximately the same.

An impact-absorber device can combine a plurality of members like the members 1 and 15 in parallel to absorb impact over a relatively large area. A device of this kind can be used on rail vehicles to absorb violent impact occurring in the event of an accident. In this case it is particularly advantageous to integrate the device into a rail vehicle chassis to constitute a "fuse" area to protect against the consequences of an accident.

Figure 4:
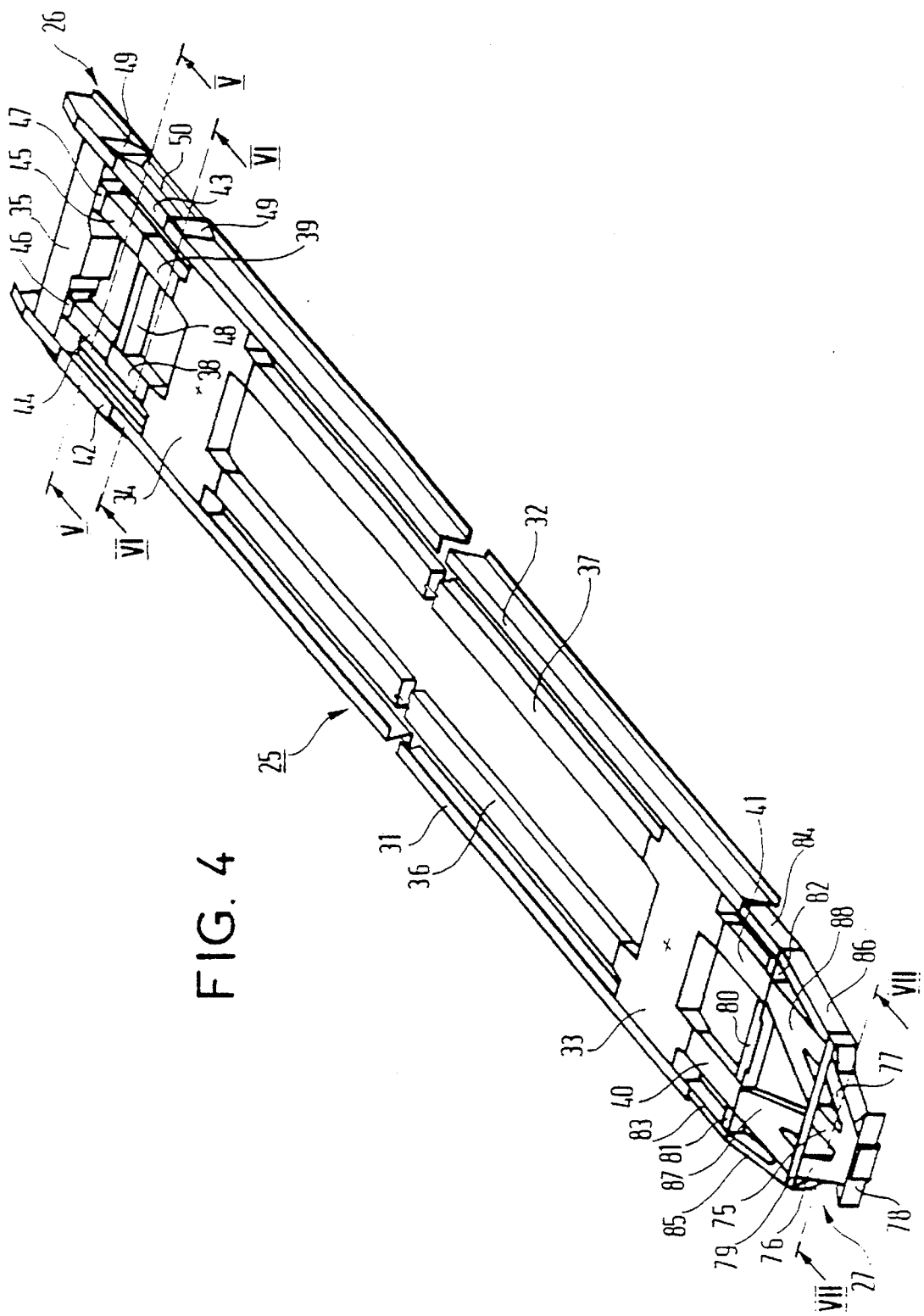
FIG. 4 shows a rail vehicle chassis incorporating impact-absorber devices of the invention.

FIG. 4 shows a rail vehicle chassis 25 including two impact-absorber devices 26 and 27 in accordance with the invention. The chassis comprises two side sills 31 and 32 between which are two pivot beams adapted to rest on bogies: the front pivot beam 33 and the rear pivot beam 34. At the rear, the side sills 31 and 32 are joined by a rear crossbeam 35. At the front the side sills 31 and 32 and the front pivot beam 33 are extended by a front part including the impact-absorber device 27.

Sole bars 36 and 37 interconnect the pivot beams 33 and 34. They are accompanied by other sole bars: the sole bars 40 and 41 extending forwardly from the pivot beam 33.

At the rear of the chassis 25 the impact-absorber device 26 is disposed between the rear crossbeam 35 and the ends of the side sills 31, 32 and the pivot beam The device 26 includes a plurality of members. The members 42 and 43 on the outside are inserted into the side sills 31 and 32. The members 44 and 45 on the inside extend the members 38 and 39 as far as the rear crossbeam 35.

For the energy absorbing members to collapse effectively in the event of a violent impact the other component parts of the chassis must be much less deformable than the members 42, 43, 44 and 45. Localized strengthening of the chassis framework can achieve this.

As the space around a pivot beam is usually congested, the length of the device 26 has deliberately been kept small. The members 42 and 43 are longer than the members 44 and 45 (see FIG. 3).

The members 44 and 45 are welded to the rear crossbeam 35 via reinforced portions 46 and 47 which widen in the direction towards the rear crossbeam 35. The portions 46 and 47 provide bases for the members 44 and 45. The member 44 is welded to the member 38 with a metal plate between them providing a base for the member 44. The same applies to the joining of the members 45 and 39. An intermediate crossbeam 48 is welded between the members 38 and 39 near the members 44 and 45.

The members 42 and 43 are welded to the side sills 31 and 32 with metal plates providing bases for these members between them. The side sills are strengthened where they are joined to the members 42 and 43 by strengthening parts 49. These strengthening parts and the proximity of the pivot beam 34 and the rear crossbeam 35 stiffen the side sills so that these portions of the latter can be regarded as undeformable compared to the impact-absorber device.

Figure 5:
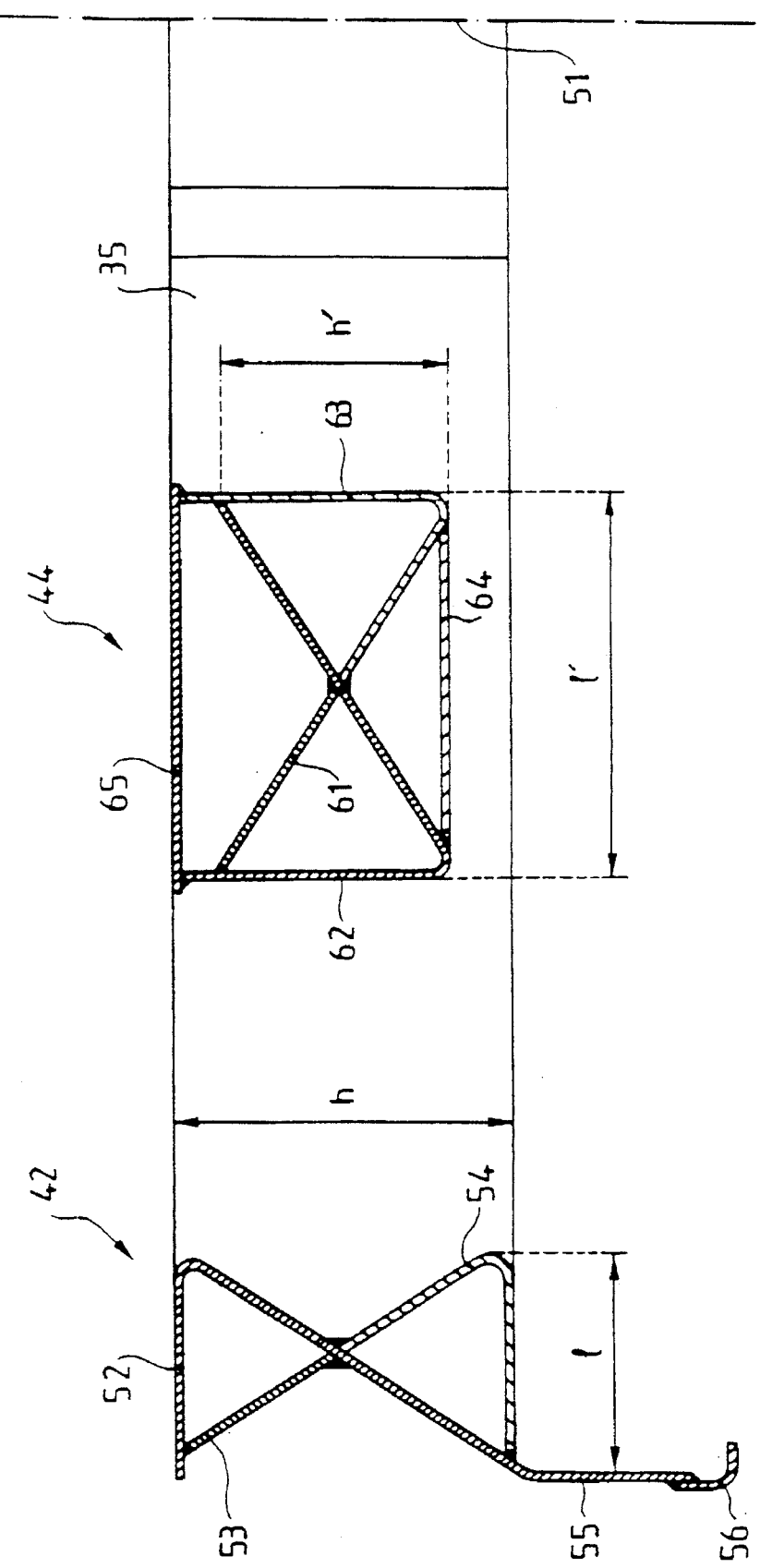
FIG. 5 shows part of the rail vehicle chassis from FIG. 4 in cross-section on the line V—V.

FIG. 5 shows only the lefthand part of the cross-section plane V—V shown in FIG. 4, the righthand part being a mirror image of the lefthand part. The axis 51 is the central vertical axis of the vehicle. The members 42 and 44 are seen in cross-section. The member 42 is of the type shown in FIG. 1. It is made up of a plurality of thin plates 52, 53 and 54 bent as necessary and welded together. For joining on the side plates it is necessary to add an appendix 56 in the lower portion welded to the extension 55 of the plate 52. This has no unwanted repercussions on the system.

The member 44 is of the type shown in FIG. 3. It is made up of a plurality of thin plates 61, 62, 63, 64 and 65 bent as necessary and welded together. The member 44 therefore has the same outside shape as the sole bars of the chassis.

The stress concentrations in the cross-sections of the members 42 and 44 are non-uniform and it is possible to compensate for the different stresses by using different grades of the materials. With the chassis made from high yield stress steel (E490D grade), for example, the plates 52, 53, 61, 62 and 65 can be made from E24 grade steel, the plates 63 and 64 from E36 grade steel and the plates 55 and 56 from E490D grade steel.

The plates can be 4 mm thick for a height h of 195 mm and a width l of 110 mm for the member 42 and for a height h' of 130 mm and a width l' of 220 mm for the member 44.

Figure 6:
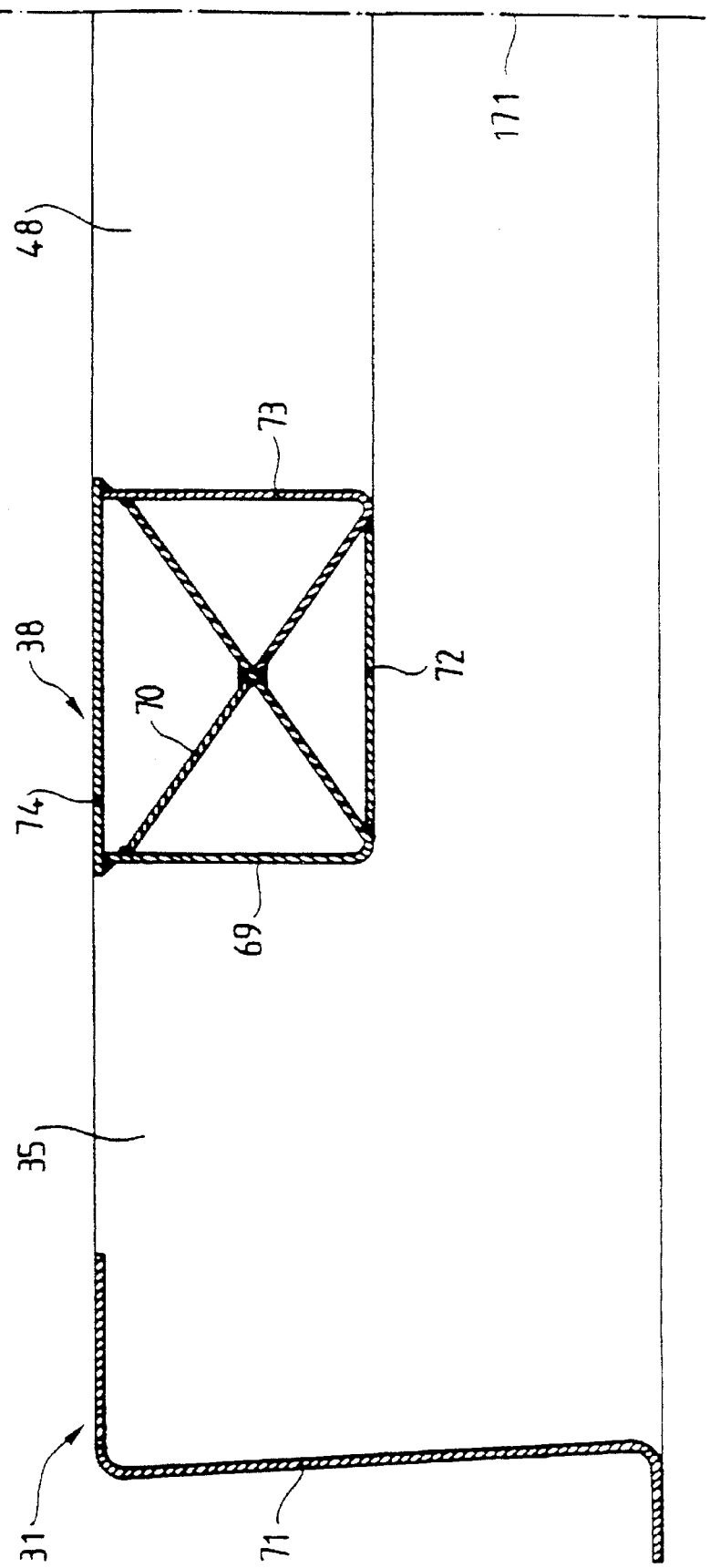
FIG. 6 shows part of the rail vehicle chassis from FIG. 4 in cross-section on the line VI—VI.

FIG. 6 shows only the lefthand part of the cross-section plane VI—VI shown in FIG. 4, the righthand part being a mirror image of the lefthand part. The axis 171 is the central vertical axis of the vehicle. The side sill 31 and the member 38 are seen in cross-section. The side sill 31 is made from bent plate 71.

The member 38 is made by welding together plates 69, 70, 72, 73 and 74.

At the front of the chassis (see FIG. 4) the impact-absorber device 27 comprises a central member 75 disposed along the central longitudinal axis of the vehicle and two side members 76 and 77 arranged in a forward-pointing V-shape. This device is between a front end plate 78 adapted to take any impact and a crossbeam 79 joined to the remainder of the chassis by a rigid mechanical structure transmitting forces between the crossbeam 79 and the front pivot beam 33. This rigid structure comprises the sole bars 40 and 41, the crossbeams 80, 81 and 82 and the girders 83, 84, 85, 86, 87 and 88.

Figure 7:
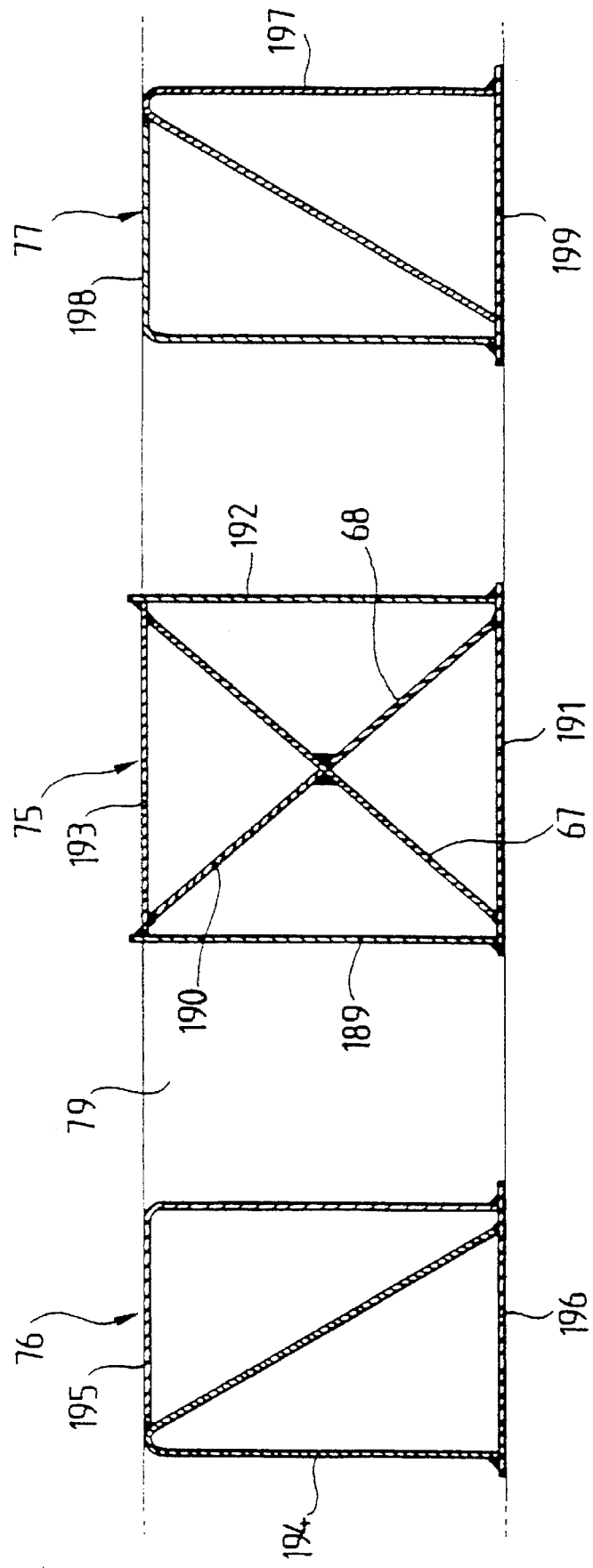
FIG. 7 shows the rail vehicle chassis from FIG. 4 in cross-section on the line VII—VII.

FIG. 7 shows the members 75, 76 and 77 in cross-section. The member 75 is of the type shown in FIG. 3. It is formed from a plurality of thin plates 189, 190, 191, 192, 193, 67 and 68 welded together.

The members 76 and 77 do not have the X-shape structure which is characteristic of the invention. The member 76 is made up of a plurality of thin plates 194, 195, and 196 bent as necessary and welded together. The plate 194 forms a diagonal of the rectangle of the cross-section of the member 76. This diagonal runs from the top lefthand corner to the bottom righthand corner.

The member 77 is made up of a plurality of thin plates 197, 198, 199 bent as necessary and welded together. The plate 197 forms a diagonal of the rectangle of the cross-section of the member 77. This diagonal runs from the top righthand corner to the bottom lefthand corner.

Making the impact-absorber device by forming and drawing is also within the scope of the present invention.

Figure 8:
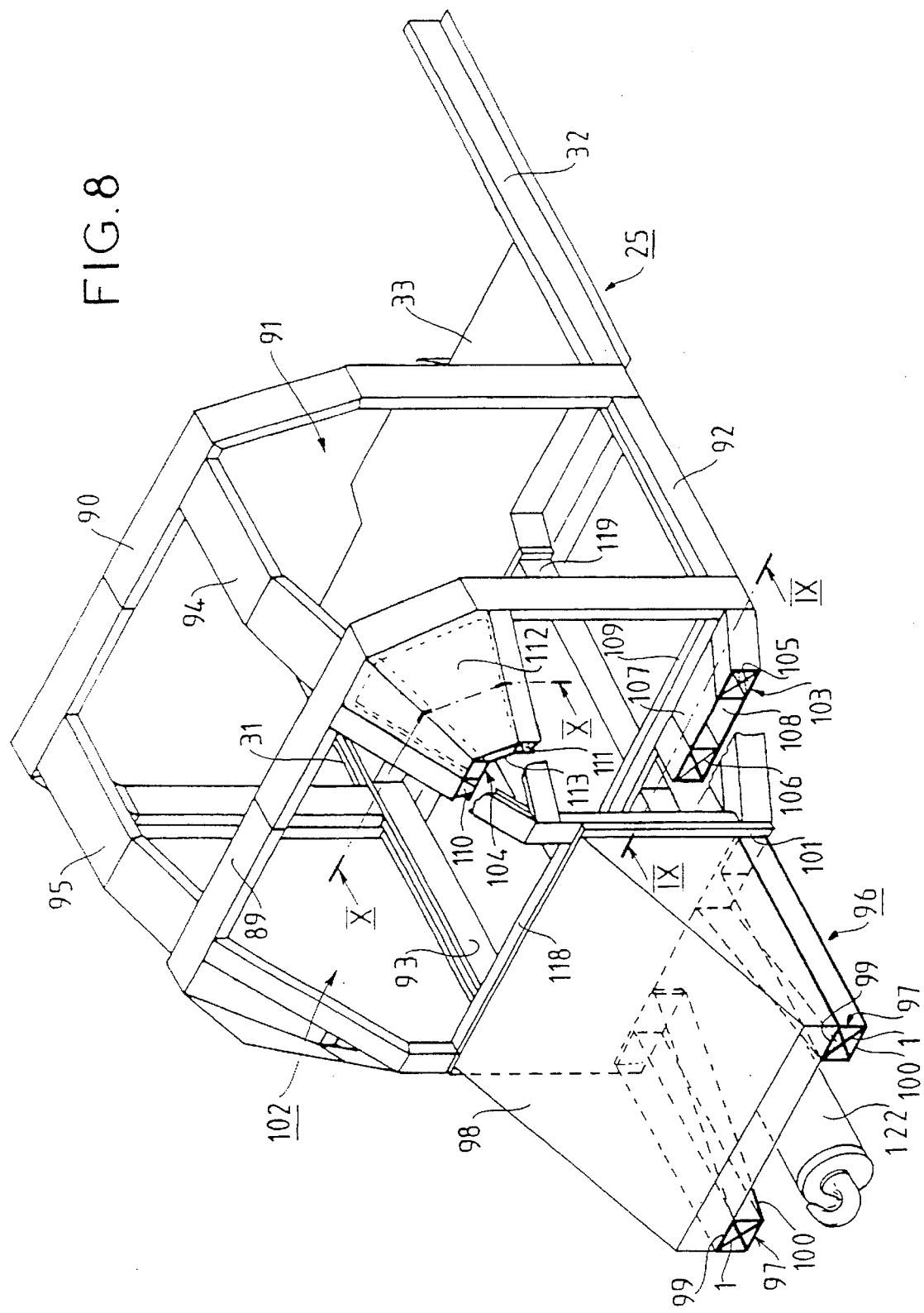
FIG. 8 shows a rail vehicle body framework incorporating impact-absorber devices of the invention.

FIG. 8 shows a front framework of a rail vehicle body including first, second, third and fourth impact-absorber devices 97, 98, 103 and 104 as described above.

The front framework of the rail vehicle body comprises a chassis 25 made up of two side sills 31 and 32 between which is disposed a front pivot beam 33 resting on a front bogie.

First and second rigid rings 89 and 90 constitute a safety cage 91. Sole bars 92 and 93 and reinforcing members 94 and 95 are fastened to the rigid rings to stiffen the safety cape.

A first deformable area 96 constituting the front part of the framework is made up of first and second impact-absorber devices 97 and 98 and a coupling bar 122.

The first impact-absorber devices 97 are disposed on respective sides of the central axis of the chassis 25. These first impact-absorber devices are generally trapezoidal and each is made up of a longitudinal member 1 according to the invention to the top and bottom of which are fastened trapezoidal plates 99 and 100.

The second impact-absorber devices 98 are made up of a prior art honeycomb type member. These second impact-absorber devices are disposed on the first impact-absorber devices 97, for example, the combination bearing against a retaining plate 101.

The prior art coupling bar 122 is disposed longitudinally, preferably between the first impact-absorbing members 97 in the first deformable area 96.

A second deformable area 102 is disposed between the first deformable area 96 and the safety cage 91.

The second deformable area 102 is made up of third and fourth impact-absorber devices 103 and 104 respectively in the lower and upper parts of this second deformable area.

The third impact-absorber devices 103 each comprise first and second impact-absorbing members 105 and 106 in accordance with the invention. The first and second impact-absorbing members 105 and 106 are disposed in a V-shape and triangular plates 107 and 108 are fastened to their top and bottom surfaces.

The plates 107 and 108 are preferably trapezoidal to absorb the initial force of a frontal impact applied to the third impact-absorber devices 103.

The third impact-absorber devices are disposed in the plane of the chassis 25 and bear against a crossbeam 109. The ends of the crossbeam 109 are fastened to the base of the first rigid ring 89.

The fourth impact-absorber devices 104 each comprise first and second impact-absorbing members 110 and 111. The first and second impact-absorbing members 110 and 111 are disposed in a V-shape and plates 112 and 113 are fastened to their top and bottom surfaces.

The plates 112 and 113 are preferably trapezoidal to absorb the initial force of a frontal impact applied to the fourth impact-absorber devices 104.

The fourth impact-absorber devices are disposed in alignment with the upper part of the first rigid ring 89 and the second impact-absorbing members 98.

Figure 13A:
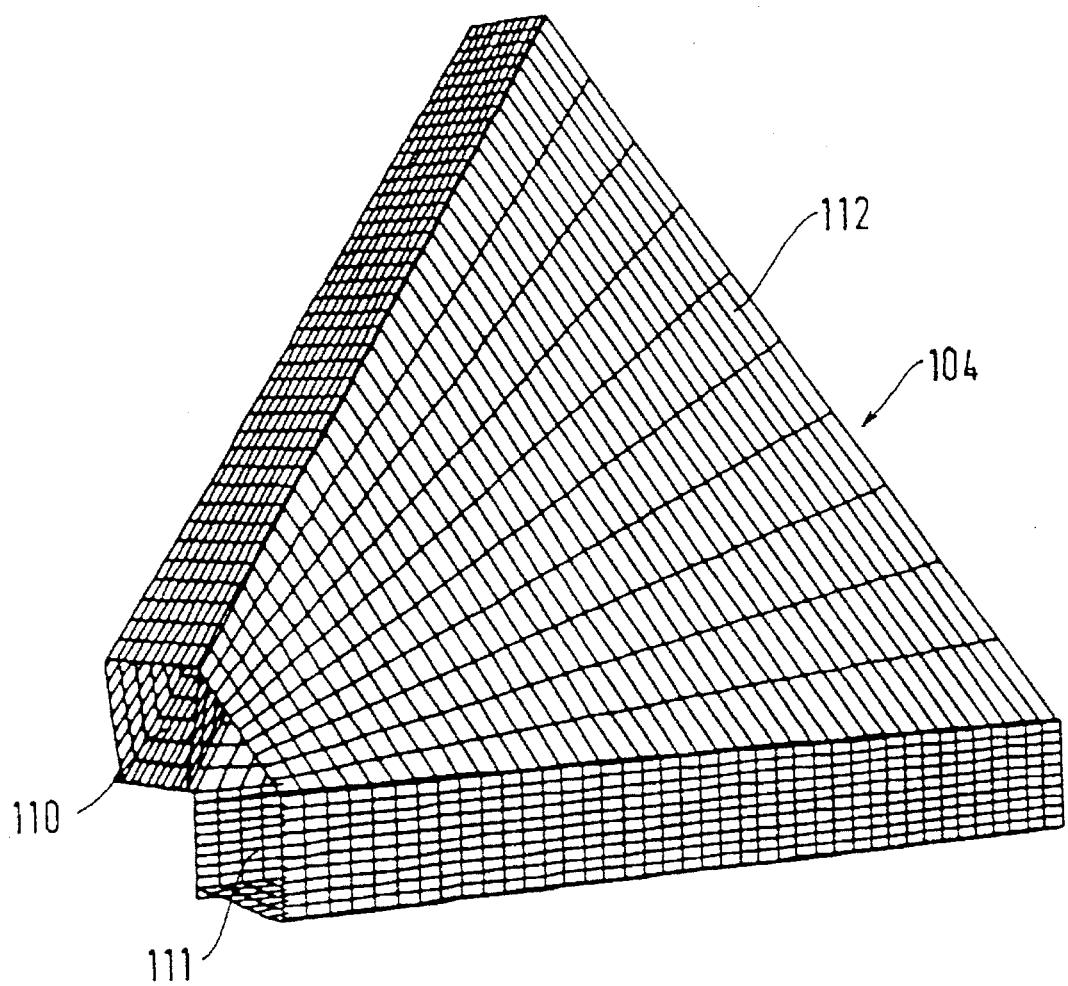
Figure 13B:
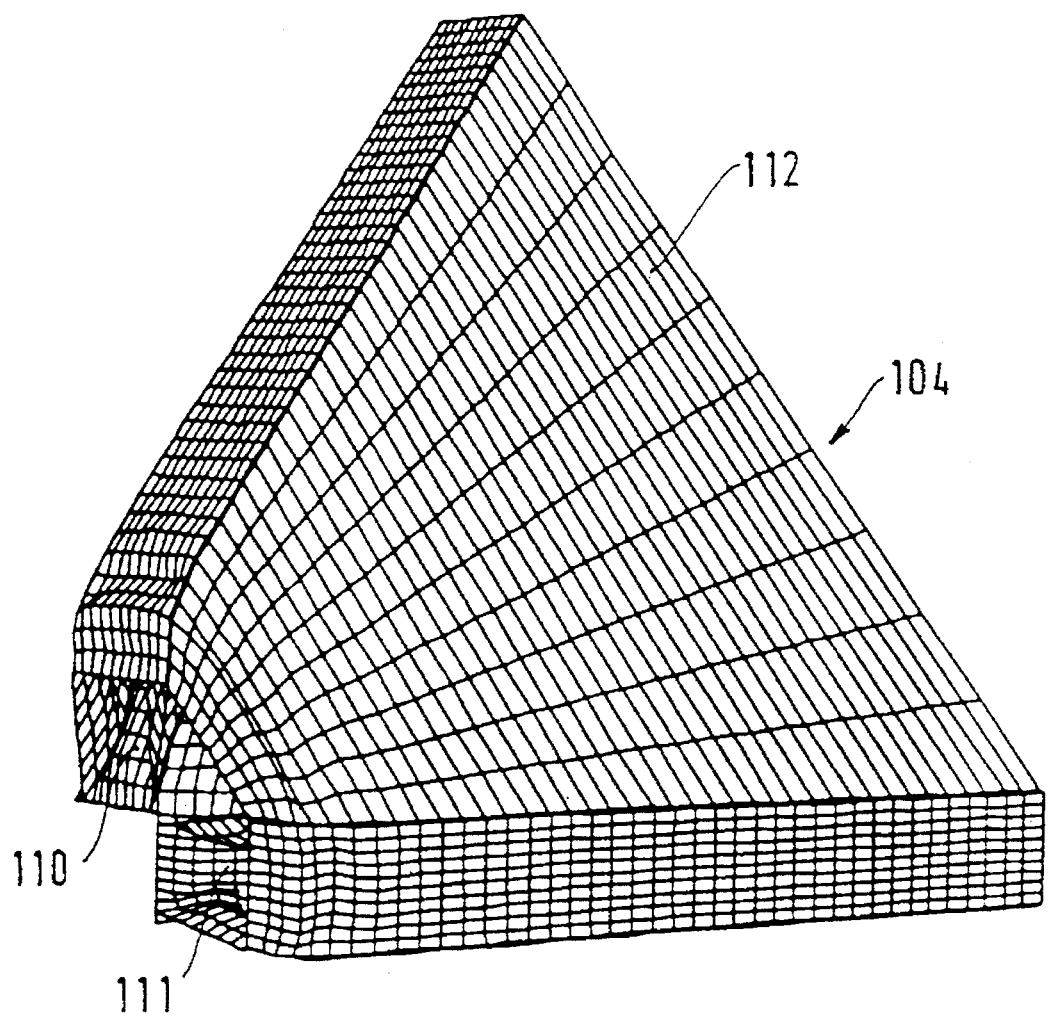

Depending on the shape of the ends of the upper part of the first rigid ring 89 on which the impact-absorber devices 104 bear, the triangular plates 112 and 113 can constitute a single plane (FIGS. 13a and 13b) or two planes as shown in FIG. 8.

The other ends of the impact-absorber devices 104 bear on the holding plate 101 through the intermediary of a support frame 118.

Guide means 119 fastened to the chassis 25 are disposed longitudinally parallel to the longitudinal axis of the chassis 25.

Figure 9:
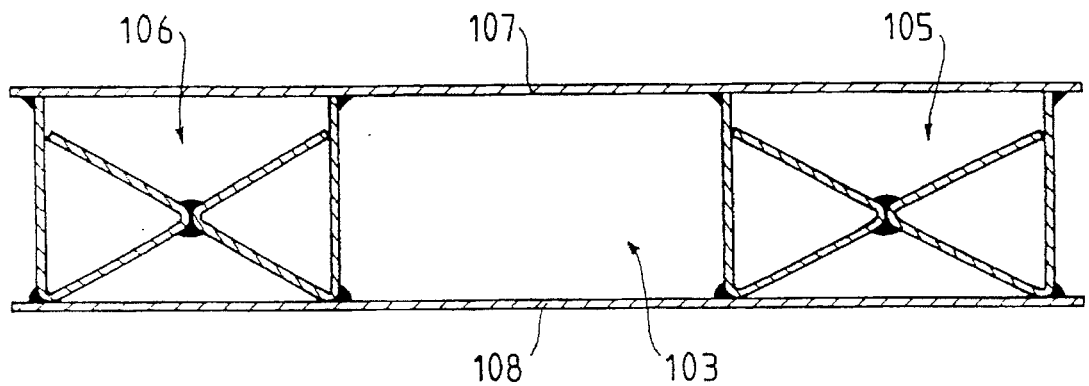
FIG. 9 shows part of the rail vehicle body framework from FIG. 8 in cross-section on the line IX—IX.

FIG. 9 shows part of the rail vehicle body framework from FIG. 8 in cross-section on the line IX—IX.

The members 105 and 106 and the trapezoidal plates 107 and 108 are seen in cross-section. The members 105 and 106 are of the type shown in FIGS. 1 to 3 and as previously described.

The main effect of the trapezoidal plates 107, 108 is to tension the longitudinal impact-absorbing members 105, 106.

As previously described the third impact-absorber devices 103 deform plastically concertina fashion in such a way that the outline of the impact-absorber device is preserved.

Figure 10:
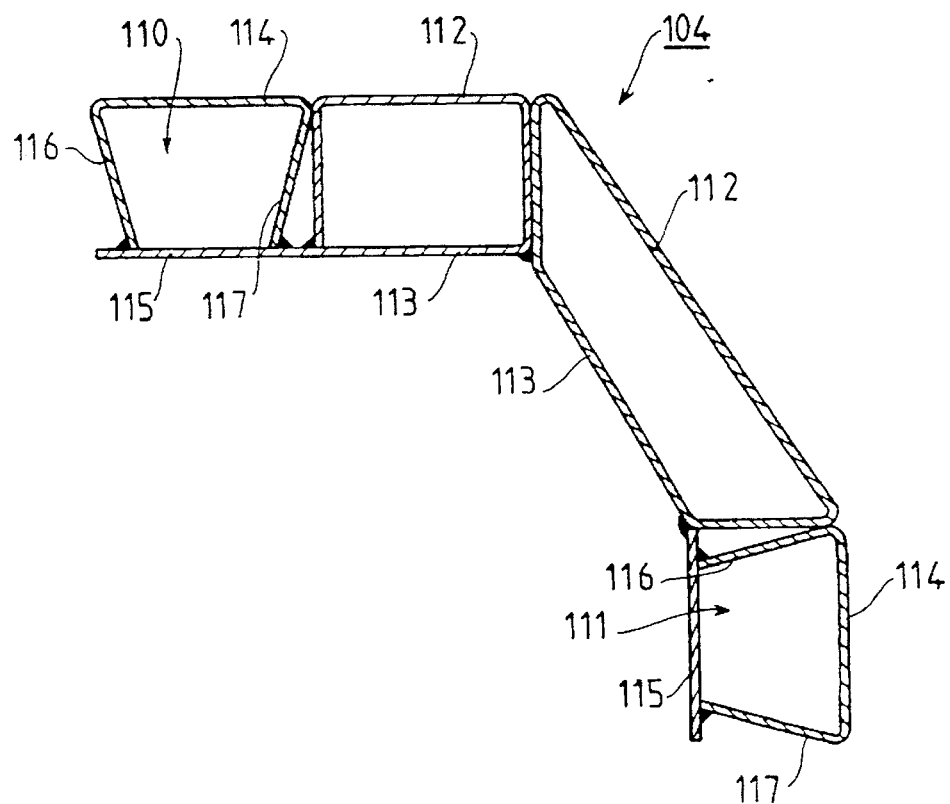
FIG. 10 shows part of the rail vehicle body framework from FIG. 8 in cross-section on the line X—X.
Figure 12A:
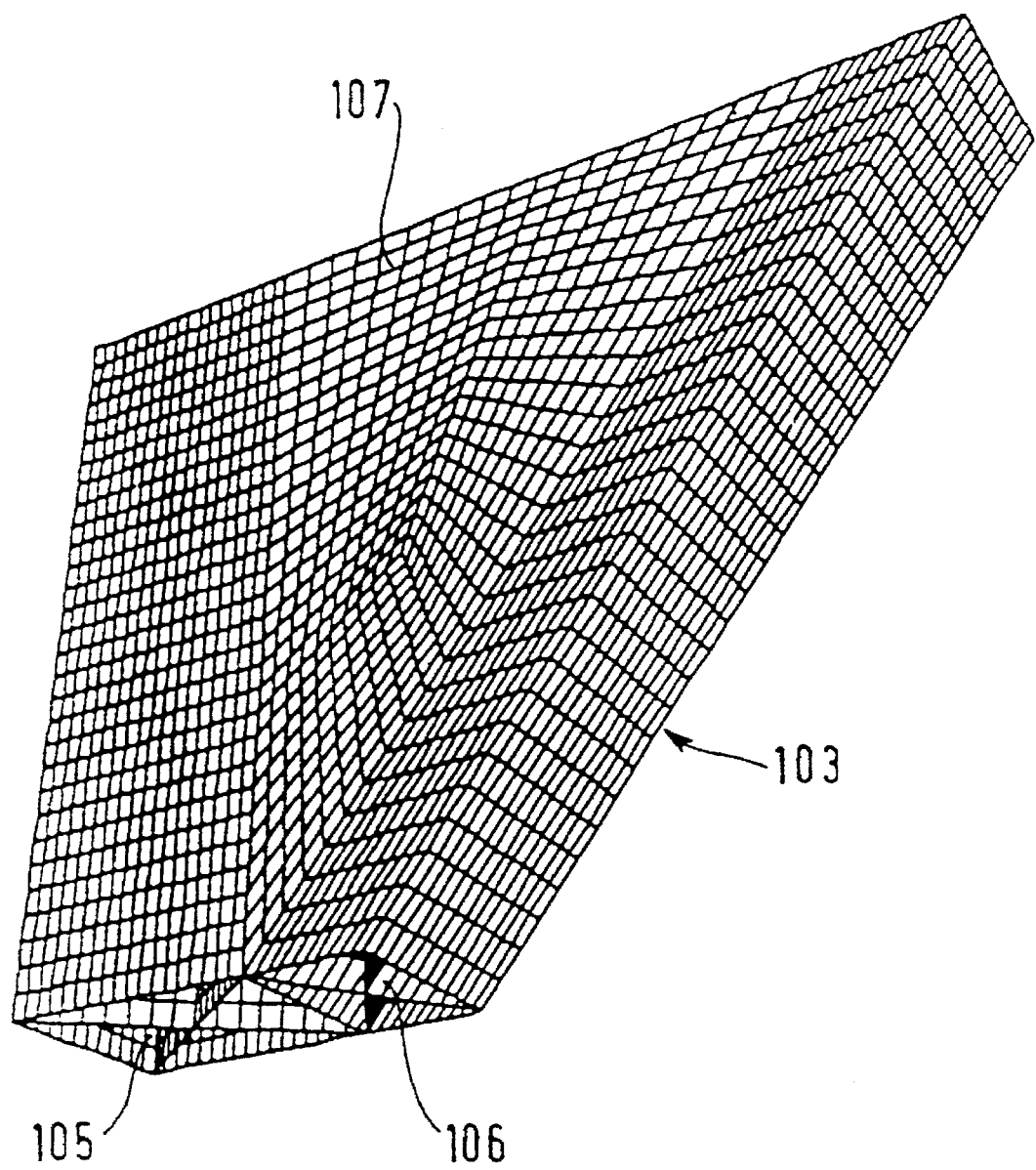
Figure 12B:
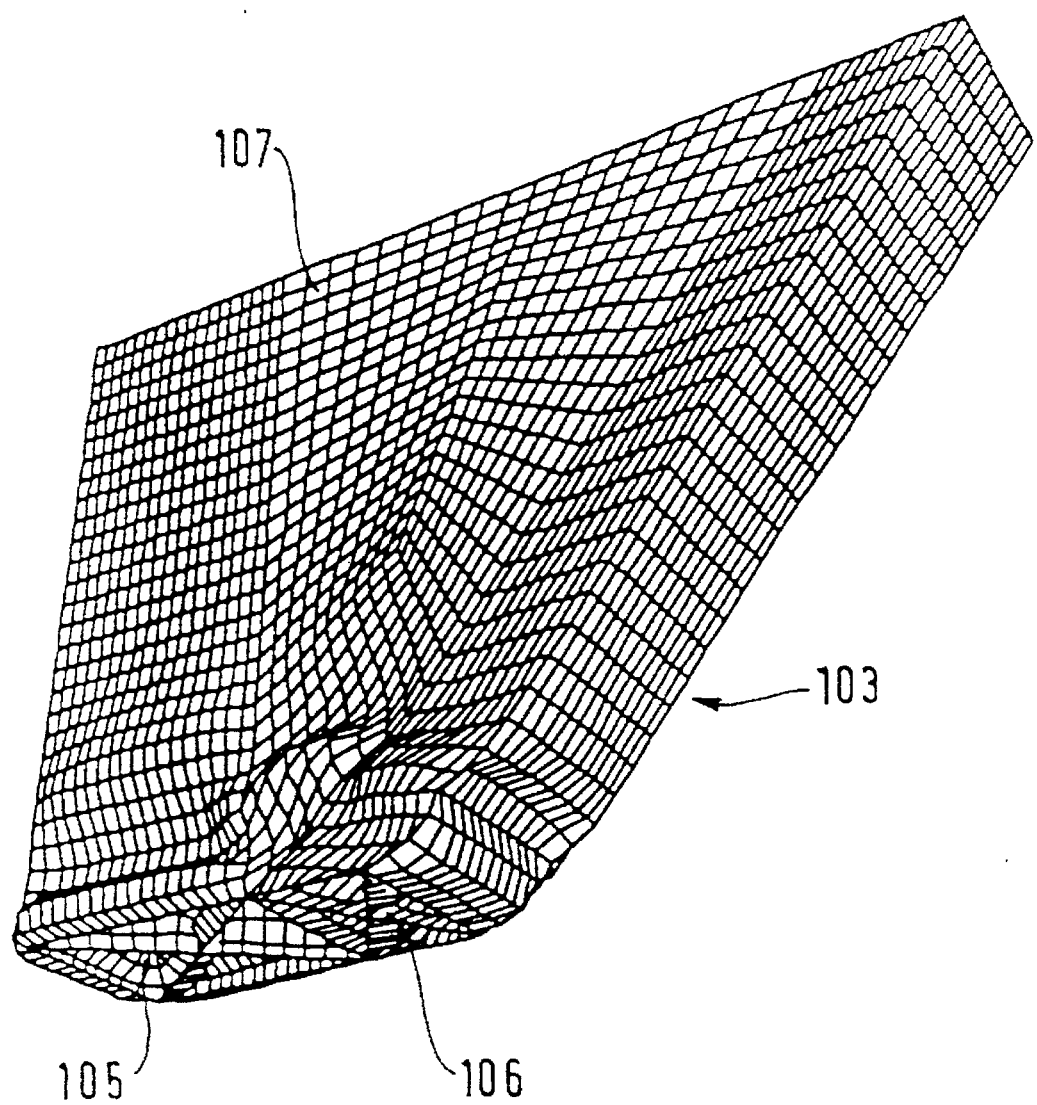
Figure 12C:
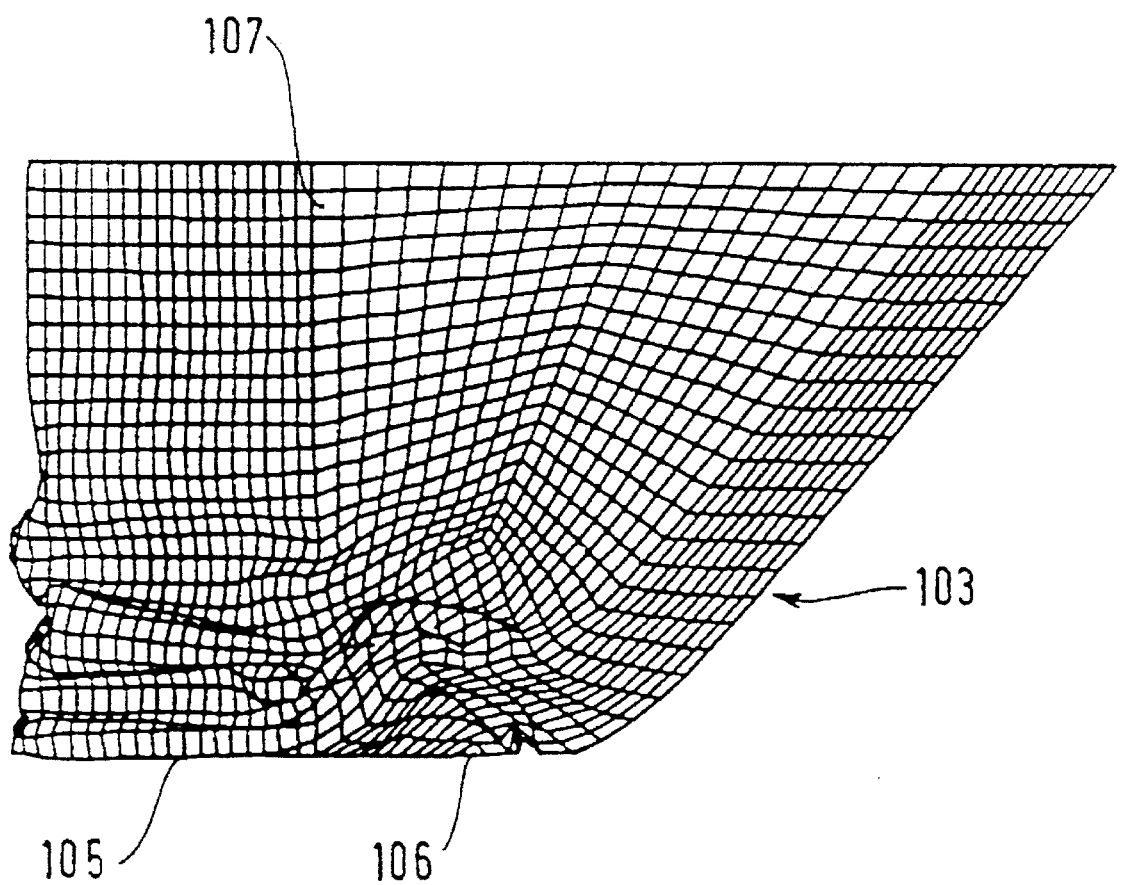
Figure 12D:
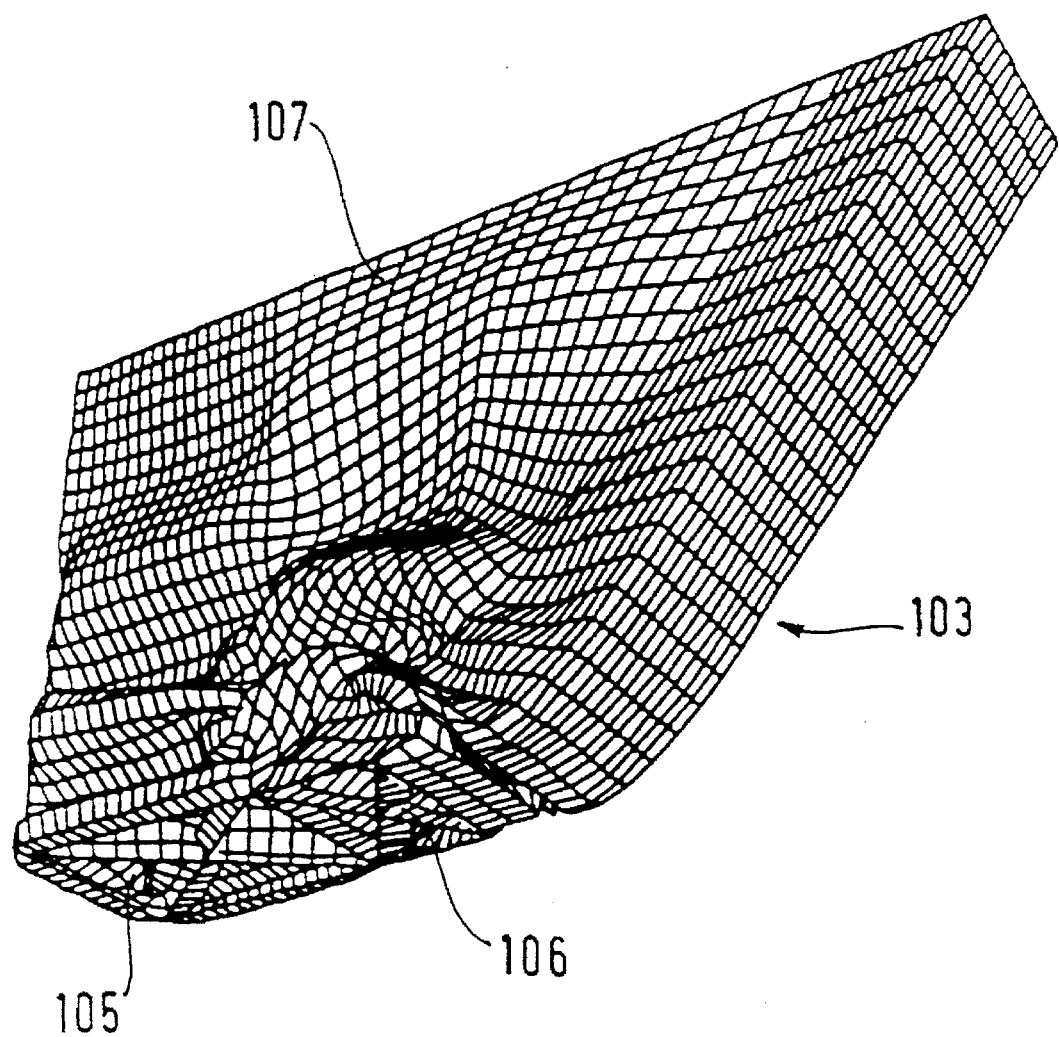

FIG. 10 shows part of the rail vehicle body framework from FIG. 8 in cross-section on the line X—X.

The members 110 and 111 and the trapezoidal plates 112 and 113 are seen in cross-section.

The first and second impact-absorbing members 110 and 111 each comprise a single longitudinal impact-absorbing member different from those shown in FIGS. 1 to 3. The cross-section of the longitudinal member is generally rectangular in shape with two parallel opposite sides 114 and 115 and two other opposite sides 116 and 117 forming with one of the parallel sides a longitudinal impact-absorbing member with a generally triangular transverse cross-section.

Because the first and second impact-absorbing members 110 and 111 are not symmetrical the remarkable result of a frontal impact to these two members is a twisting effect rather than a buckling effect. As a result of this, the fourth impact-absorber device 104 is deformed in a vertical plane that moves in the direction of the impact causing the deformation. This deformation in a vertical plane is related to the presence of the trapezoidal plates 112 and 113.

As previously described, the fourth impact-absorber devices 104 deform plastically concertina fashion so that the external contour of the impact-absorber device is preserved.

A vital consequence of the deformation in the vertical plane of the third and fourth impact-absorber devices 103, 104 is that the support frame 118 and the first rigid ring 89 remain parallel to each other in the event of a frontal impact.

FIG. 11 is a cross-section view of the rail vehicle body framework from FIG. 8.

FIG. 11 shows the chassis 25 comprising the two side sills 31 and 32 between which is disposed the front pivot beam 33 resting on the front bogie.

The first and second rigid rings 89, 90 constitute the safety cage 91. The sole bars 92 and 93 are fastened to the rigid rings.

The first deformable area 96, constituting the front part of the framework, comprises the first impact-absorbing members 97 and the second impact-absorbing members (not shown) and a coupling bar 122.

The first impact-absorber devices 97 are on respective sides of the central axis of the chassis 25. The first impact-absorber devices are generally trapezoidal and each comprises a longitudinal member 1 in accordance with the invention.

The first impact-absorber devices 97 bear against the holding plate 101 which is fastened to the support frame 118.

The second deformable area 102 is disposed between the first deformable area 96 and the safety cage 91.

The second deformable area 102 comprises the third impact-absorber devices 103 and the fourth impact-absorber devices (not shown).

The third impact-absorber devices 103 each comprise first and second impact-absorbing members 105, 106 in accordance with the invention the top and bottom surfaces of which are fastened to trapezoidal plates 107 and 108.

The third impact-absorber devices 103 are disposed in the plane of the chassis 25 and bear against a crossbeam 109. The ends of the crossbeam 109 are fastened to the base of the first rigid ring 89.

The guide means 119 fastened to the chassis 25 are disposed longitudinally parallel to the longitudinal axis of the chassis 25. In the preferred embodiment the guide means 119 comprise the longitudinal slider 120 adapted to slide in the longitudinal guide 121.

Also in the preferred embodiment the longitudinal guide 121 is fixed to the chassis 25 and is delimited by the length of the safety cage 91.

The longitudinal slider 120 is fixed at one end, at the end adjoining the support frame 118, for example, in such a way that its other end can slide in the longitudinal guide 121.

The coupling bar 122 is disposed longitudinally, preferably between the first impact-absorbing members 97 in the first deformable area 96.

The coupling bar 122 bears against a first bearing plate 123 in such a way that the bearing plate 123 and the end of the coupling bar 122 can slide in the longitudinal guide 121.

First, second and third longitudinal impact-absorbing members 124, 126 and 128 in accordance with the invention are freely slidable in the longitudinal slider 120.

These longitudinal impact-absorbing members in accordance with the invention respectively constitute the fifth, sixth and seventh impact-absorber devices.

The first and second longitudinal members 124, 126 bear against a second bearing plate 125 in such a way that the second bearing plate 125 is able to slide in the longitudinal guide 121.

The second and third longitudinal members 126, 128 bear against the third bearing plate 127 in such a way that the third bearing plate 127 is able to slide in the longitudinal slider 120 and even in the longitudinal guide 121.

The third longitudinal members 128 bear against a fourth bearing plate 129 which is fastened to the pivot beam 33.

Table 1 summarizes the main technical data for each of the impact-absorber devices used in the front framework of a rail vehicle body in the preferred embodiment of the invention.

TABLE 1

| ABSORBER DEVICE | LONGIT MEMBER | MATERIAL (STEEL) | WIDTH mm | HEIGHT mm | RATING kN |
| --- | --- | --- | --- | --- | --- |
| 97 (1st) | 1 | Z8 CN 12 | 250 | 150 | 1 000 |
| 98 (2nd) | | prior art | | | |
| 103 (3rd) | 105 106 | Z8 CN 12 | 100 | 150 | 400 |
| 104 (4th) | 110 111 | Z8 CN 12 | 200 | 150 | 900 |
| 124 (5th) | 124 | Z8 CN 12 | 250 | 170 | 1 100 |
| 126 (6th) | 126 | Z8 CN 12 | 250 | 170 | 1 400 |
| 128 (7th) | 128 | Z8 CN 12 | 250 | 250 | 1 700– 2 500 |

In the event of a frontal impact, for example, between the vehicle fitted with impact-absorber devices of the invention and another vehicle or fixed buffers at the end of the track the impact-absorber devices collapse.

By virtue of the basic technical effect of the invention the collapse of the impact-absorber devices results in concertina type deformation of the longitudinal impact-absorbing members. This deformation occurs in a vertical plane which moves in the direction of impact.

As previously stated, the concertina type deformation of the members occurs in such a way that the external contour of the members is approximately preserved.

FIGS. 12a to 12d and 13a and 13b show various stages in the collapse of the third and fourth impact-absorber devices 103, 104, respectively.

These figures show the concertina type deformation of the impact-absorber devices and that their external contour is preserved.

The invention also concerns an impact-absorption method based on the use of the rail vehicle body framework incorporating impact-absorber devices in accordance with the invention.

The impact-absorption method in accordance with the invention is such that in a frontal impact the passenger and driver areas do not undergo any plastic deformation before all possible energy has been absorbed by the impact-absorber devices.

FIGS. 14a, 14b to 17a, 17b show four successive phases in the deformation of the rail vehicle body framework incorporating impact-absorber devices of the invention.

In these figures the same reference numbers as used previously indicate the same components.

FIGS. 14a, 14b to 17a, 17b show a coupling bar 130 disposed at the rear end of the rail vehicle body framework.

The coupling bar 130 includes a longitudinal impact-absorbing member 131 of the invention and as shown in FIGS. 1 to 3 the outermost end of which is adapted to slide in a longitudinal guide 132 fastened to the chassis 25 of the framework.

The coupling bar 130 thus constitutes an eighth impact-absorber device.

Table 2 summarises the main technical data for the eighth impact-absorber device used in the rear framework of the rail vehicle body in accordance with the invention.

TABLE 2

| ABSORBER DEVICE | LONGIT MEMBER | MATERIAL (STEEL) | WIDTH mm | HEIGHT mm | RATING kN |
|---|---|---|---|---|---|
| 130 (8th) | 131 | Z8 CN 12 | | | 1 100 |

Figure 14A:
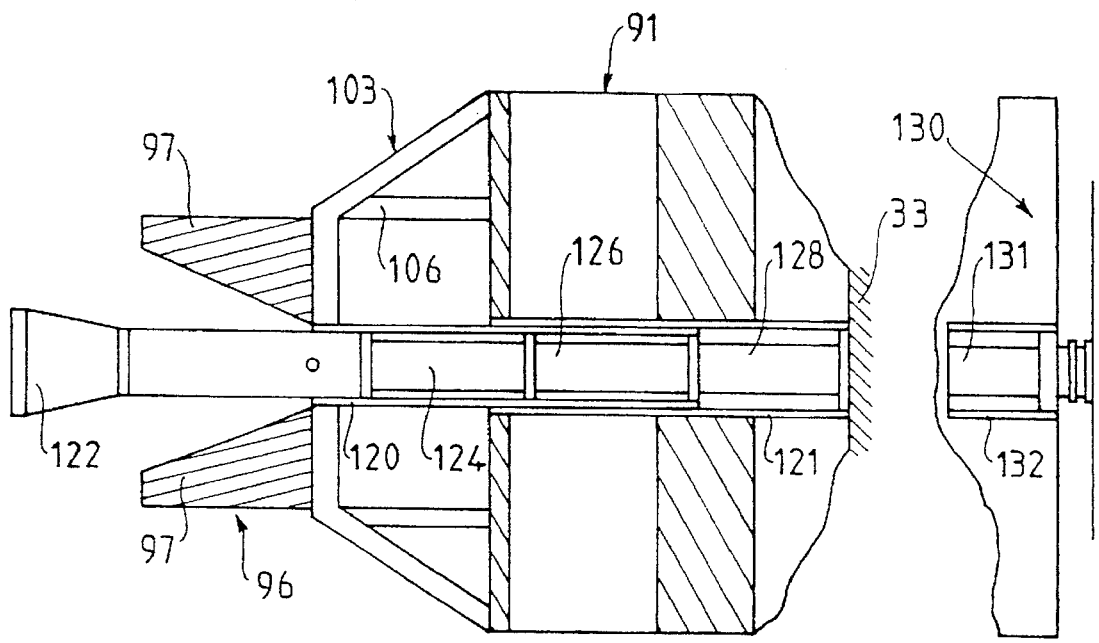
Figure 14B:
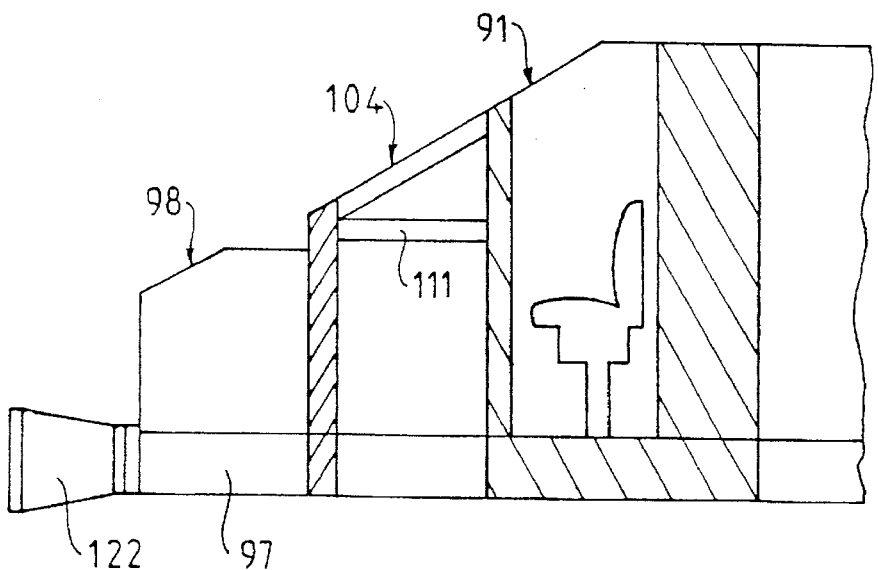

The first phase, shown in FIGS. 14a and 14b is suited to vehicle speeds in the range 0 m/s to 3 m/s. In this first phase the energy of the impact is absorbed by elastic deformation of the coupling bar 122.

In this phase I, given the speed, the impact is "viscoelastic" and the acceleration does not exceed 3 g.

The coupling bar 122 undergoes longitudinal elastic displacement and enters the longitudinal slider 120 without any deformation of the framework, especially the impact-absorber devices.

The longitudinal displacement of the coupling bar 122 from its original position is in the order of 190 mm, for example. The original position of the coupling bar 122 (before the impact) and its final position (at the end of phase I) are shown in FIGS. 14a and 14b.

Figure 15A:
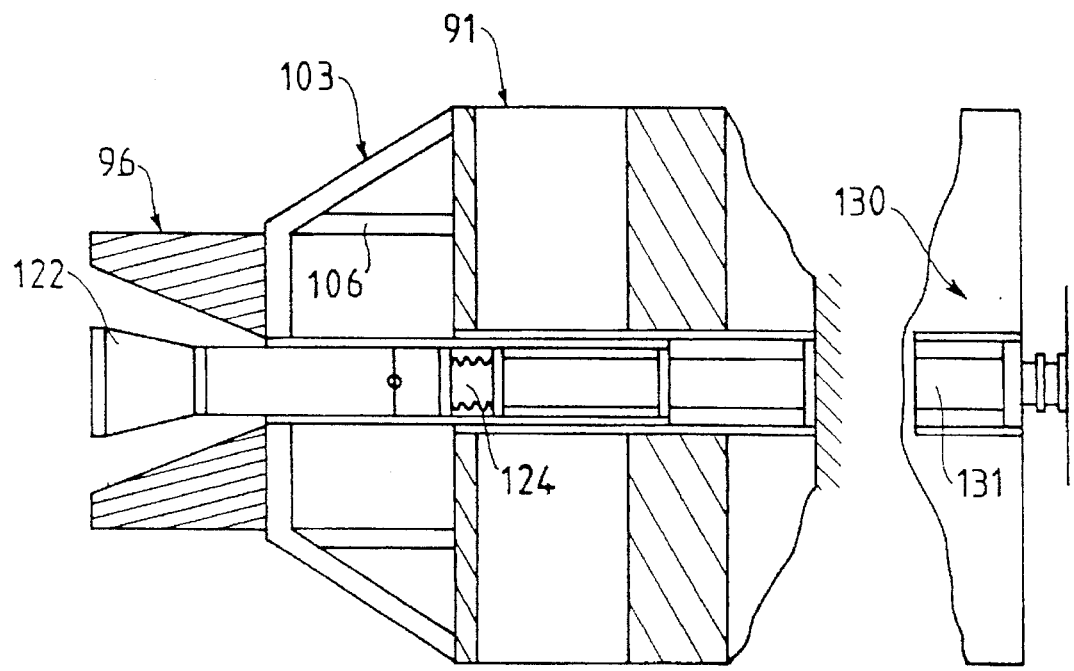
Figure 15B:
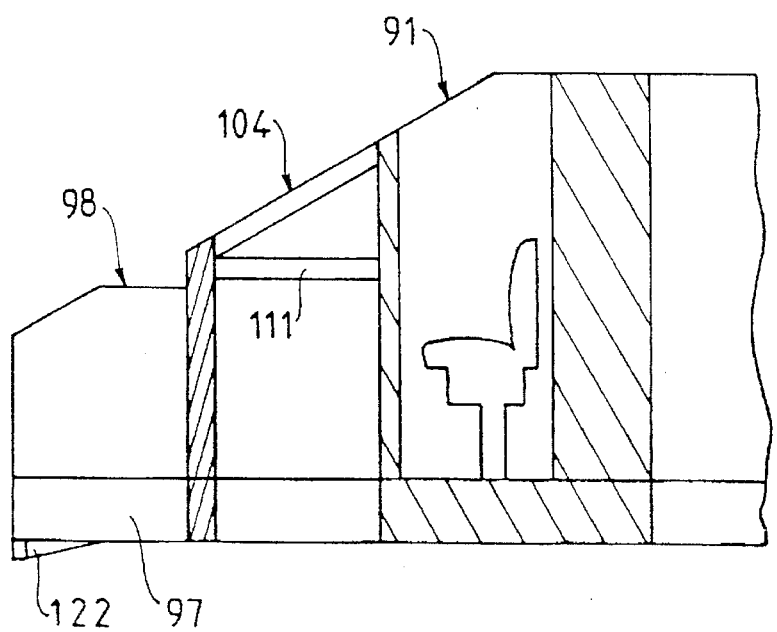

The second phase, shown in FIGS. 15a and 15b, is suited to vehicle speeds between 3 m/s and 5 m/s.

The acceleration in this phase II does not exceed 5 g.

The coupling bar 122 is displaced longitudinally and enters further into the longitudinal slider 120.

The energy is absorbed by plastic deformation of the fifth and eighth impact-absorber devices 124, 130.

The longitudinal displacement of the coupling bar 122 relative to its position at the end of phase I is in the order of 550 mm, for example, a displacement of 740 mm from its original position. The original position of the coupling bar 122 and its final position (at the end of phase II) are shown in FIGS. 15a and 15b.

Figure 16A:
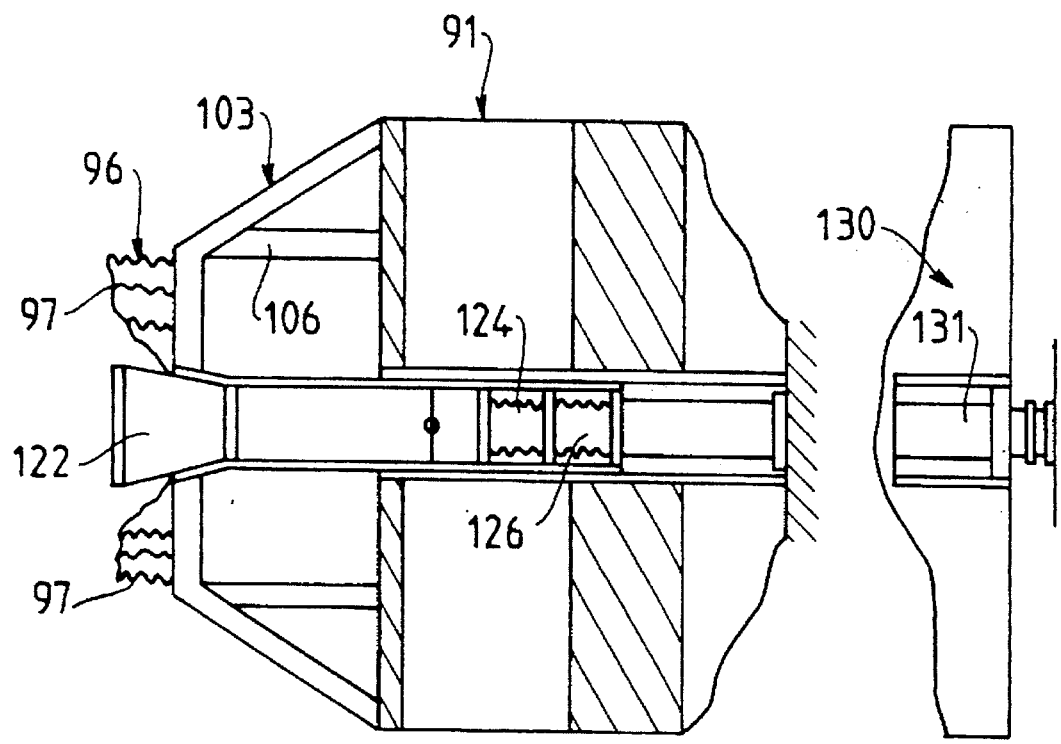
Figure 16B:
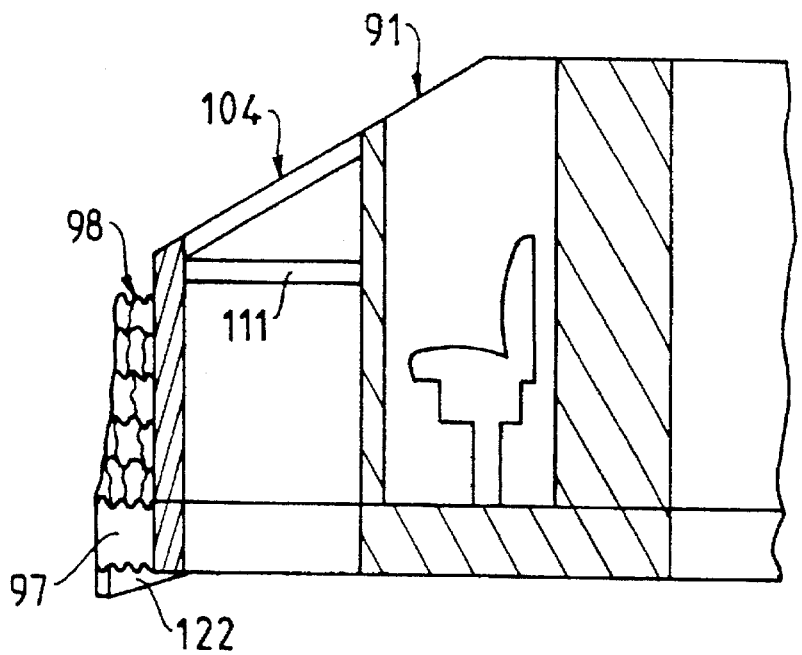

The third phase, shown in FIGS. 16a and 16b, is suited to vehicle speeds between 5 m/s and 10 m/s.

In this phase III the coupling bar 122 is displaced longitudinally and enters further into the longitudinal slider 120.

The energy is absorbed by plastic deformation of the first, second and sixth impact-absorber devices 97, 98 and 126.

The longitudinal displacement of the coupling bar 122 relative to its position at the end of phase II is in the order of 576 mm, for example, a displacement in the order of 1 286 mm from its original position. The original position of the coupling bar 122 and its final position (at the end of phase III) are shown in FIGS. 16a and 16b.

Figure 17A:
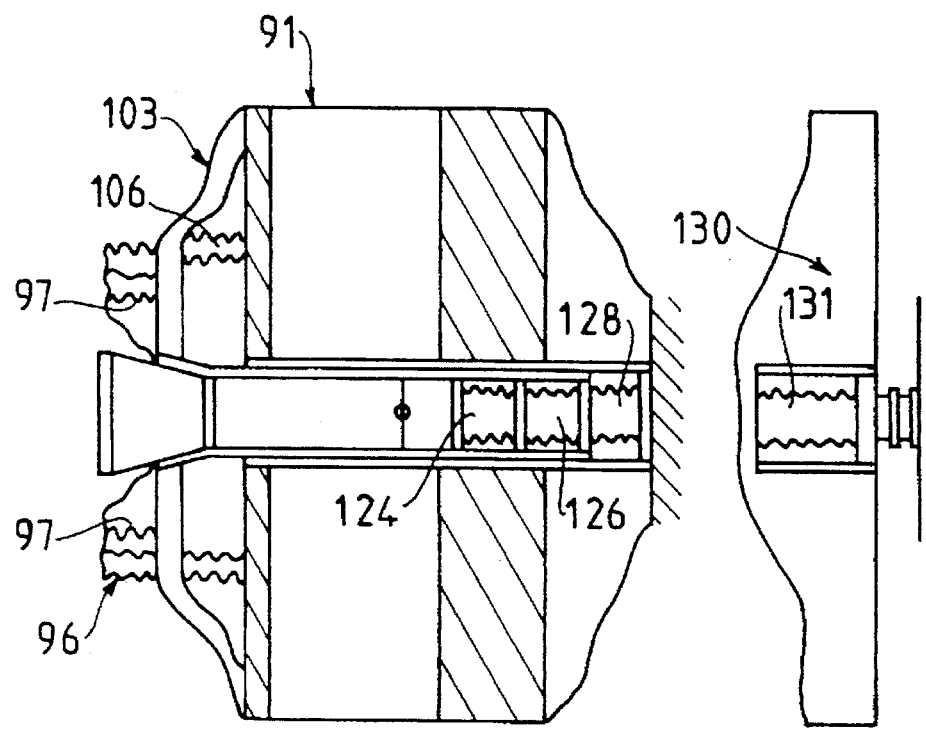
Figure 17B:
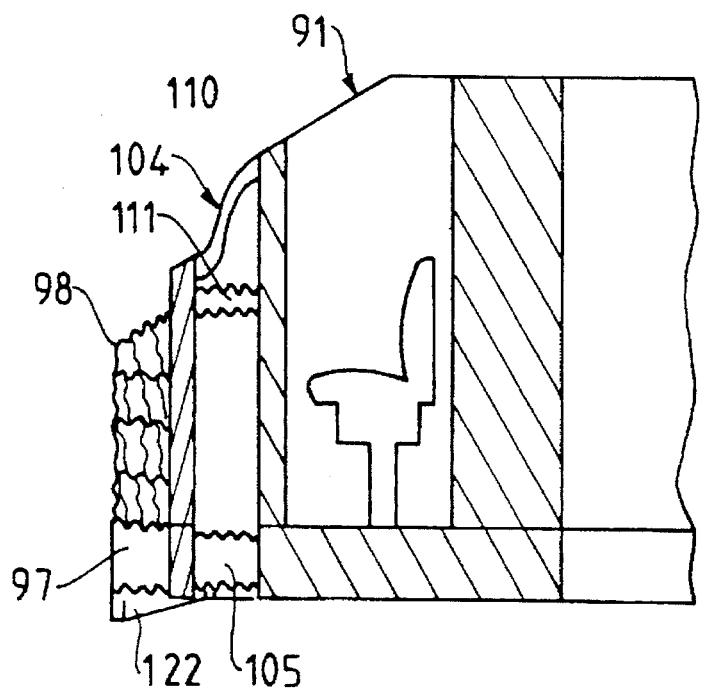

The fourth phase, shown in FIGS. 17a and 17b, is suited to vehicle speeds in excess of 10 m/s.

In this phase IV the coupling bar 122 is displaced longitudinally and enters further into the longitudinal slider 120.

The energy is absorbed by plastic deformation of the third, fourth and seventh impact-absorber devices 103, 104 and 128.

The longitudinal displacement of the coupling bar 122 relative to its position at the end of phase III is in the order of 480 mm, for example, a displacement in the order of 1 766 mm from its original position. The original position of the coupling bar 122 and its final position (at the end of phase IV) are shown in FIGS. 17a and 17b.

We claim:

1. An impact-absorber device comprising:

a longitudinal member, absorbing energy generated by an impact by collapsing concertina style in a given direction of impact;

said member having a first side parallel to a second side;

said first side being connected with two other sides;

said two other sides being inclined inwardly, and being connected to said second side;

said member being made from thin plate; and said first side and said two other sides having a generally triangular cross-section in a plane perpendicular to said given direction of impact.

2. A device according to claim 1 wherein said member has reinforcements in planes perpendicular to the direction of impact.

3. A device according to claim 1 wherein said member has stamped areas.

4. A device according to claim 1 wherein said member is made of steel.

5. A device according to claim 1 wherein said cross-section has parts with different yield stresses.

6. A device according to claim 1 wherein said first side and said two other sides made from said thin plate is a bent thin plate, and said second side is welded to said bent thin plate.

7. An impact-absorber device comprising:

longitudinal impact-absorbing members, including a first and a second member; and a first and a second connecting plate;

each of said members having a common direction of impact, and having a cross-section, in a plane perpendicular to said direction of impact, wherein:

said cross-section is defined by a three-sided piece and a base;

said three-sided piece has a middle side, and two other opposite sides which are formed therewith and extend from respective edge portions thereof;

said base is opposite to and parallel with said middle side; and said other opposite sides are inclined toward each other, and are connected to said base at respectively spaced positions;

said base of said first member being perpendicular to said base of said second member, and being connected with said base of said second member by said first connecting plate; and said middle side of said first member being connected with said middle side of said second member by said second connecting plate; and each of said longitudinal impact-absorbing members being formed of metal plate, the thickness of which permits collapse, concertina fashion, in said direction of impact;

whereby said impact absorber device absorbs by deformation impact energy generated by an impact in said given direction.

8. A safety cage for a vehicle, said safety cage comprising:

a framework having a rigid ring, and an upper deformable area;

said upper deformable area being disposed forward of said rigid ring along a general direction of impact;

said upper deformable area having an upper impact-absorber device comprising:

longitudinal impact-absorbing upper members, including a first and a second upper member; and a first and a second upper connecting plate;

each of said upper members having a common direction of impact, and having a cross-section, in a plane perpendicular to said direction of impact, wherein:

said cross-section is defined by a three-sided piece and a base;

said three-sided piece has a middle side and two other opposite sides which are formed therewith and extend from respective edge portions thereof;

said base is opposite to and parallel with said middle side; and said other opposite sides are inclined toward each other, and are connected to said base at respectively spaced positions;

said base of said first upper member being perpendicular to said base of said second upper member, and being connected with said base of said second upper member by said first upper connecting plate; and said middle side of said first upper member being connected with said middle side of said second upper member by said second upper connecting plate; and each of said longitudinal impact-absorbing upper members being formed of metal plate, the thickness of which permits collapse, concertina fashion, in said direction of impact;

whereby said upper impact absorber device absorbs by deformation impact energy generated by an impact in said given direction.

9. The safety cage as set forth in claim 8, further comprising:

a lower deformable area;

said lower deformable area being disposed forward of said rigid ring along said general direction of impact;

said lower deformable area having a lower impact-absorber device comprising:

an first lower plate in vertical alignment with, and parallel to, an identical second lower plate, said first lower plate and said second lower plate extending in said general direction of impact; and lower longitudinal impact-absorbing members, including a first and a second lower member, in parallel with and connected between said first and said second lower plate, and extending in said direction of impact;

wherein a respective central longitudinal axis of said first lower member is angled from the respective central longitudinal axis of said second lower member;

wherein each of said lower members has a cross-section, in a plane perpendicular to said direction of impact, in the shape of two opposite triangles having parallel bases and a common vertex; and wherein each of said lower members is formed of metal plate, the thickness of which permits collapse, concertina fashion, in said direction of impact;

whereby said lower impact absorber device absorbs by deformation impact energy generated by an impact in said given direction.

\* \* \* \* \*